United States Patent
Goodwill et al.

(10) Patent No.: US 12,019,288 B2
(45) Date of Patent: Jun. 25, 2024

(54) OPTICAL POWER DISTRIBUTION SYSTEM

(71) Applicant: HUAWEI TECHNOLOGIES CO., LTD., Shenzhen (CN)

(72) Inventors: Dominic John Goodwill, Ottawa (CA); Eric Bernier, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 79 days.

(21) Appl. No.: 17/731,359

(22) Filed: Apr. 28, 2022

(65) Prior Publication Data

US 2022/0350096 A1    Nov. 3, 2022

Related U.S. Application Data

(60) Provisional application No. 63/182,295, filed on Apr. 30, 2021.

(51) Int. Cl.
*G02B 6/42* (2006.01)
*G02B 6/27* (2006.01)

(52) U.S. Cl.
CPC ......... *G02B 6/4246* (2013.01); *G02B 6/2706* (2013.01)

(58) Field of Classification Search
CPC ................. G02B 2006/12154; G02B 6/29391
See application file for complete search history.

(56) References Cited

U.S. PATENT DOCUMENTS

| | | | | |
|---|---|---|---|---|
| 9,912,408 B2 * | 3/2018 | Mekis | .................. | H04J 14/02 |
| 11,131,806 B2 * | 9/2021 | Koch | .................. | G02B 6/1228 |
| 2012/0237161 A1 | 9/2012 | Ross et al. | | |
| 2018/0123693 A1 * | 5/2018 | Yang | .................. | G02B 6/4249 |
| 2018/0341061 A1 * | 11/2018 | Carpentier | ......... | G02B 6/12004 |
| 2020/0358531 A1 * | 11/2020 | Olson | .................. | H04L 5/0044 |
| 2022/0320832 A1 * | 10/2022 | Koch | .............. | H04B 10/50572 |
| 2022/0350096 A1 * | 11/2022 | Goodwill | ................. | G02B 6/30 |

FOREIGN PATENT DOCUMENTS

| | | |
|---|---|---|
| CN | 108700790 A | 10/2018 |
| CN | 111551914 A | 8/2020 |
| WO | 2014121443 A1 | 8/2014 |
| WO | 2019205918 A1 | 10/2019 |
| WO | 2020164171 A1 | 8/2020 |

OTHER PUBLICATIONS

Sacher, W.D., et al (2018). Monolithically integrated multilayer silicon nitride-on-silicon waveguide platforms for 3-D photonic circuits and devices. Proceedings of the IEEE, 106(12), 2232-2245.

* cited by examiner

*Primary Examiner* — Rhonda S Peace

(57) ABSTRACT

There is provided an optical power distribution system including an input optical fiber receiving light having an optical power. The optical power distribution system further includes an optical power distribution splitter optically coupled to the input optical fiber, the optical power distribution splitter including an all-dielectric optical waveguide, the optical power distribution splitter configured to divide the optical power into two or more portions. The optical power distribution system further includes an optical device optically coupled to optical power distribution splitter, the optical device including an optical waveguide having a semiconductor layer, the optical device receiving a first portion of the optical power.

18 Claims, 9 Drawing Sheets

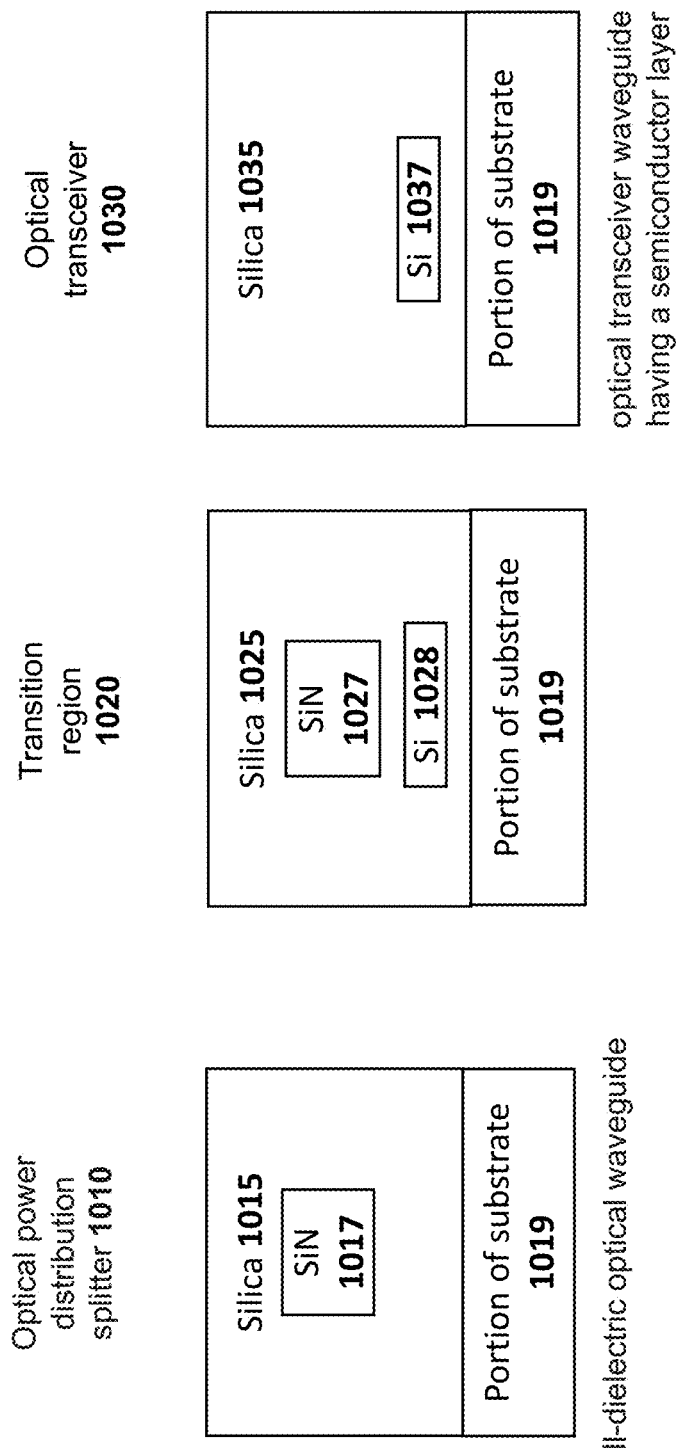

OPTICAL POWER DISTRIBUTION SYSTEM

CROSS-REFERENCE TO RELATED APPLICATIONS

This application claims the benefit of priority to the United States Patent Application having Ser. No. 63/182,295 and entitled "OPTICAL POWER DISTRIBUTION SYSTEM" filed Apr. 30, 2021, which is hereby incorporated by reference in its entirety.

FIELD

The present invention generally pertains to the field of optical components, and particular embodiments or aspects relate to optical power transfer.

BACKGROUND

In an optical transceiver system, a continuous wave laser light source may be separated from an optical transceiver, with an optical power delivery fiber from the laser light source to the transceiver. An optical power delivery fiber may deliver enough optical power for multiple transceivers. The transceiver may include semiconductor material. The delivery optical power level may be higher than the optical power handling limit of the semiconductor of the transceiver and thus this delivery optical power may for example exceed the damage limit or exceed the saturation limit of the transceiver.

Given the above, typically, to overcome the issue that the delivery optical power may for example exceed the damage limit or exceed the saturation limit of the transceiver, optical power can be provided to a transceiver by a low-power laser. Furthermore, a low-power laser is more reliable than a high-power laser.

Optical fibers and optical connectors can support high optical power. In a prior art passive optical network (PON), for example as illustrated in FIG. 1, there is an optical signal splitter implemented in a dielectric optical waveguide. Similarly, in a prior art wavelength division multiplexing (WDM) system, for example as illustrated in FIG. 2, there is an optical signal splitter implemented in a dielectric optical waveguide for optical demultiplexing (e.g. arrayed waveguide grating). Such PON or WDM system may support modulated signals having a high optical power. Having regard to FIG. 1 and FIG. 2, an arrow associated with each of the lines indicates the direction of the propagation of light, the lines with arrows having a circle associated therewith indicate an optical fiber and the lines with just arrows indicate an optical waveguide. However, these prior art configurations include an optical signal splitter for connecting modulated light and thus are not configured to split a continuous-wave optical power.

Accordingly, there may be a need for an assembly that is not subject to one or more limitations of the prior art.

This background information is intended to provide information that may be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

According to an aspect of the present invention, there is provided an optical power distribution system including an input optical fiber configured to receive light having an optical power. The optical power distribution system further includes an optical power distribution splitter optically coupled to the input optical fiber, the optical power distribution splitter including an all-dielectric optical waveguide, the optical power distribution splitter configured to divide the optical power into two or more portions. An all-dielectric optical waveguide is an optical waveguide wherein all light carried by the optical waveguide intersects with only dielectric materials. The optical power distribution system further includes an optical device optically coupled to the optical power distribution splitter, the optical device including an optical waveguide having a semiconductor layer, the optical device configured to receive a first portion of the optical power. An optical waveguide having a semiconductor layer is an optical waveguide wherein the light carried by the optical waveguide intersects with at least one region of semiconductor materials.

According to some embodiments, the optical device is an optical transceiver and the optical waveguide having the semiconductor layer is an optical transceiver waveguide. In some embodiments, the optical power of the light is larger than a damage threshold of the optical transceiver waveguide. In some embodiments, the optical power of the light is larger than a saturation limit of the optical transceiver. In some embodiments, the optical device receives a first portion of the optical power, wherein the first portion of the optical power is indicative of an optical power modulation level that is suitable for use by the optical device.

According to some embodiments, the all-dielectric optical waveguide is parallel to and overlapping the optical transceiver waveguide. In some embodiments, the all-dielectric optical waveguide and optical transceiver waveguide are configured as layers within one die and the all-dielectric optical waveguide and optical transceiver waveguide are optically coupled together within a shared optical coupling region which is also known as a transition region. In some embodiments, the shared optical coupling region includes a directional coupler or an adiabatic coupler. In some embodiments, the all-dielectric optical waveguide is collinear to the optical transceiver waveguide. In some embodiments, the all-dielectric optical waveguide and the optical transceiver waveguide are formed on separate die that are optically coupled, wherein the separate die are optically coupled using die-to-die edge coupling, die-to-die evanescent coupling or die-to-die grating coupling.

According to some embodiments, the optical power distribution splitter includes an input optical waveguide optically coupled to two or more output optical waveguides, said input optical waveguide and output optical waveguides being implemented on one die. In some embodiments, the optical power distribution splitter includes an optical splitter that is wavelength independent. In some embodiments, the optical power distribution splitter includes one or more of a Y junction, a multi-mode interferometer, a trident splitter, an adiabatic coupler and a directional coupler.

According to some embodiments, the light has two polarizations. In some embodiments, the optical power distribution splitter includes a polarization splitter or a polarization splitter rotator.

According to some embodiments, the light has two or more wavelengths. In some embodiments, the optical power distribution splitter includes an optical wavelength splitter. In some embodiments, the optical wavelength splitter is configured as one or more of an asymmetric Mach Zehnder interferometer, an arrayed waveguide grating, an Echelle grating or a star coupler.

According to some embodiments, the all-dielectric optical waveguide is formed from a material having a bandgap and the light has a photon energy, wherein the bandgap is greater than twice the photon energy.

According to some embodiments, the optical device is one or more of a transmitter, a receiver, a transceiver, a detector, a direct-modulation transmitter, a coherent-modulation transmitter and a coherent-detection detector.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 10A illustrates a cross section of an optical power distribution splitter within a monolithic PIC in accordance with embodiments.

FIG. 10B illustrates a cross section of a transition region or shared optical coupling region between the optical power distribution splitter and an optical device, in this example an optical transceiver, both of which are within a monolithic PIC, in accordance with embodiments.

FIG. 100 illustrates a cross section of an optical device, in this example an optical transceiver, in a monolithic PIC, in accordance with embodiments.

DETAILED DESCRIPTION

Figure 1:
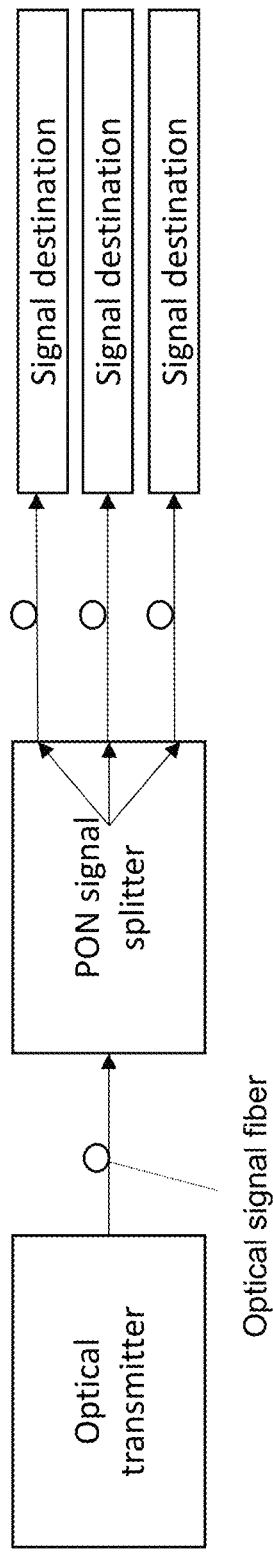
FIG. 1 is a block diagram of a passive optical network according to the prior art.
Figure 2:
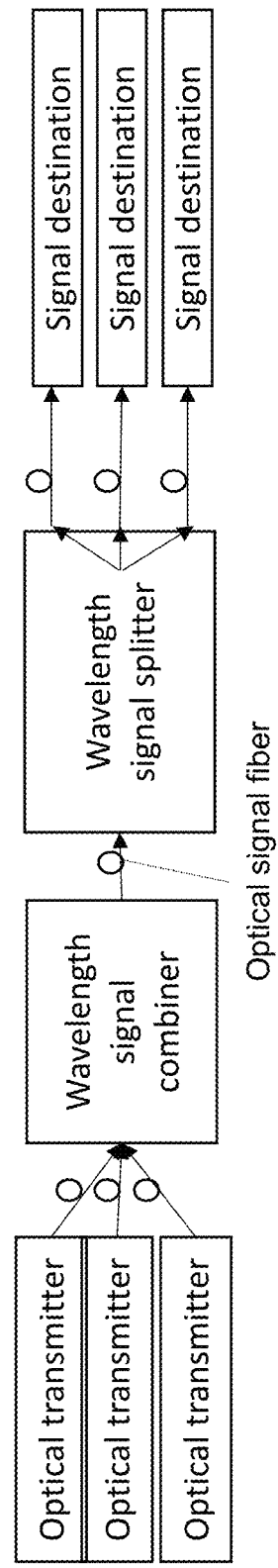
FIG. 2 is a block diagram of a wave division multiplexing system according to the prior art.

In order to overcome the delivery of optical power at a level which may be higher than the optical power handling limit of the input of a semiconductor of a transceiver, typically, either the laser itself is directly modulated, or each laser is coupled to just one optical modulator.

When using co-packaged optics, there are a significant number of transceivers (for example 32) in a very small space (for example 2 cm squared). Such co-packaged optics would need a large number of lasers, however there is little space to include lasers in these types of co-packaged optics.

A low-power laser may be in the range 1 mW to 40 mW, whereas a high-power laser may exceed this range. However, a low-power laser lacks the capability to drive multiple transceivers. It may be advantageous to deploy a relatively small number of high-power lasers that are each shared by multiple transceivers, instead of individual low-power lasers each associated to a singular transceiver, as the high-power laser may have a relatively smaller size or lower cost on a per-transceiver basis.

As a further problem in co-packaged optics, the transceivers are in the highest temperature region of the system. For example, the transceivers are very close to a large electrical integrated circuit that generates a large amount of heat. It is known that the performance of suitable lasers (for example semiconductor laser diodes) degrades at high temperature.

As such it is desired that the laser be separated from the transceivers with optical power from the laser being delivered to the transceivers through optical fibers. However this increases the packaging cost. Furthermore, coupling each laser to just one optical modulator increases the number of fibers.

Because the laser may now be separated, there is a motivation to minimize the number of fibers required to deliver the optical power, because optical fiber assembly results in significant costs. Furthermore, as the laser is separated from the transceiver, the laser can be replaced when it fails, without needing to replace the whole system. Therefore, a less reliable laser which can provide higher power is reasonable, provided that the power from such a high-power laser can be delivered to multiple transceivers.

A problem to be solved is the need to couple high optical power received from an optical fiber into multiple lanes on the transceiver. However, the optical power level is typically more than the power limit of a waveguide that has a semiconductor core. Such limits can include limits due to self-induced non-linear absorption wherein the incident light creates electrical carriers that create further absorption. The non-linear absorption may include two-photon absorption. Further limits can be dependent on limitations of damage from heat created by absorbing significant optical power. However, because of cost, reliability and manufacturing complexity, the use of an external device to split the received optical power is undesirable. It is therefore desired that a solution for the splitting of high optical power to a suitable level for a transceiver should preferably be integrated with the transceiver.

As such, an optical power delivery fiber may deliver enough optical power for multiple transceivers. Such an arrangement may be particularly advantageous for a co-packaged optical transceiver system, wherein many transceivers are close by each other and close to an electrical processing chip, to maximize communications throughput per unit area. In such a co-packaged system, an optical power distribution system may deliver power from laser light sources that are separated from the transceivers, so as to facilitate repair or to allow a controlled temperature environment for the laser.

Alternatively, such an arrangement may be advantageous for sensors that include a laser light source and an optical transceiver, wherein a specialized laser is separated from the sensor transceiver. Such sensors may include lidar sensors, biological sensors or other sensors. According to embodiments, the optical transceiver can impose a modulation signal on the light, wherein the modulation signal may be in the time or frequency domain, as may be useful for communication or the modulation signal may be in the space domain, as may be useful for a beam scanning sensor.

Accordingly, the present disclosure is directed towards an optical power distribution system that allows the use of a high optical power device for delivery of optical power, for example a continuous wave high power laser, while further complying with the lower optical power limits of the optical device. In some embodiments, the optical device may be a transceiver. The optical transceiver can be an optical communication transceiver, a lidar transceiver, an optical sensing transceiver or other optical transceiver. In some embodiments the optical device may be a signal processor, a neuromorphic processor, a sensor, a gyroscope, a quantum computing device, an optical computing device, an optical switch, a radio-frequency processor, a radio-frequency mixer, a radio-frequency or other optical device that requires optical power for its operation. The optical device includes an optical device waveguide. It will be readily understood that while some embodiments described herein are discussed as including an optical transceiver waveguide, those skilled in the art will appreciate that the discussions relating to the optical transceiver waveguide may be equally applicable to an optical device waveguide associated with an optical device as defined above or elsewhere herein.

According to embodiments, there is provided an implementation for a co-packaged optic which uses an external light source and a transceiver. The external light source can include one or more lasers that are connected to the optical transceiver module by optical power delivery fibers. The transceiver may be a silicon photonic transceiver.

According to embodiments, the optical power from each laser is shared by several transceiver lanes, for example, 4 or 8 lanes. This sharing of the optical power is provided by an optical power distribution system according to embodiments. The optical transceiver may include an optical modulator wherein the incident laser power is modulated by the optical modulator. The optical transceiver may include a coherent optical transceiver wherein the incident laser power is a local oscillator for the optical receiver.

According to embodiments, the optical power distribution system splits the optical power into multiple lanes such that each lane has a power level that is suitable for use by an optical transceiver. The optical power distribution system has an optical power delivery level, which is the optical power received from the optical power delivery fiber from the laser, and an optical power modulation level which is an optical power level that is suitable for use by the optical device.

Figure 3:
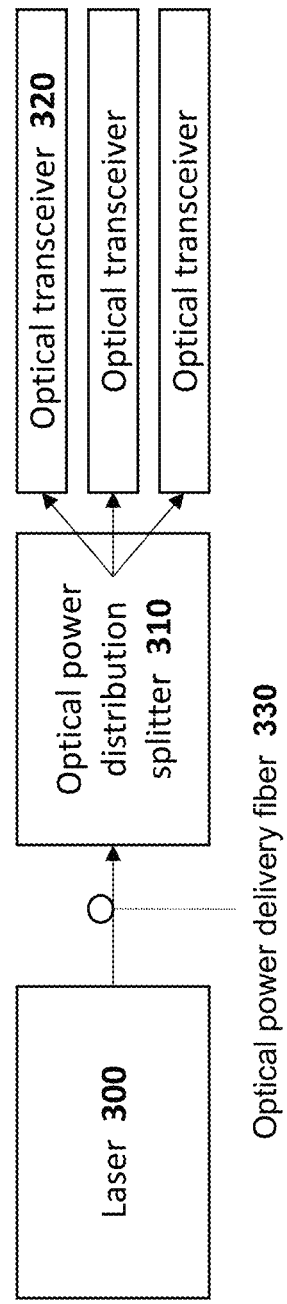
FIG. 3 illustrates an optical power delivery system, in accordance with embodiments.

An optical power distribution system according to embodiments is illustrated in FIG. 3. The optical power distribution system includes one or more lasers optically coupled to an optical power delivery fiber. The optical power delivery fiber delivers the optical power to an optical power distribution splitter, which splits the received optical power into two or more lanes, wherein each lane is associated with an optical device, which can be configured as an optical transmitter, an optical receiver, a direct-modulation transmitter, a coherent-modulation transmitter, a coherent-detection detector or an optical transceiver.

FIG. 3 illustrates an example wherein the optical device is an optical transceiver. The optical power delivery fiber conveys light from the laser to the optical power distribution splitter. In some embodiments, this light may be unmodulated, also known as continuous wave light. In some embodiments, this continuous wave light may be frequency dithered as may be required for suppressing stimulated Brillouin scattering or for creating a frequency dithered optical carrier wave for frequency-based sensing.

In some embodiments, the optical power distribution splitter includes an all-dielectric optical waveguide. In some embodiments, the optical transceiver includes a waveguide having a semiconductor layer. In some embodiments, the light in the optical power delivery fiber does not carry an optical transmission signal. In some embodiments, the optical transceiver imposes a signal upon the light.

In some embodiments, the all-dielectric optical waveguide is parallel to and overlapping the optical transceiver waveguide. For example, the coupling between the parallel waveguide is provided by a direction coupler.

In some embodiments, the all-dielectric optical waveguide and the optical transceiver waveguide include layers within one die that are optically coupled together by a shared optical coupling region. In some embodiments, the shared optical region includes a directional coupler or an adiabatic coupler.

In some embodiments, the all-dielectric optical waveguide is collinear to the optical transceiver waveguide. For example, the coupling is configured as a butt-coupling.

With further reference to FIG. 3, the laser 300 delivers light to the optical power delivery fiber 330. The optical power deliver fiber 330 is optically connected to the optical power distribution splitter 310. The optical coupling between the optical power deliver fiber 330 and the optical power distribution splitter 310 can be provided by edge coupling, butt coupling, grating coupling, evanescent coupling or other form of optical coupling as would be readily understood. The optical power distribution splitter 310 separates the optical power into multiple lanes, thereby reducing the optical power conveyed along each of these lanes. Each lane of the optical power distribution splitter 310 is optically coupled to a respective optical device, which can be an optical transceiver 320, optical transmitter or optical receiver depending on the embodiment. The optical coupling between each lane of the optical power distribution splitter 310 and the respective optical device can be provided by edge coupling, butt coupling, grating coupling, evanescent coupling or other form of optical coupling as would be readily understood.

In some embodiments, the optical power distribution splitter includes an input optical waveguide optically coupled to a plurality of output optical waveguides said input optical waveguide and output waveguides being implemented on one die. In some embodiments, the optical power distribution splitter includes an optical splitter that is essentially wavelength dependent. In some embodiments, the optical power distribution splitter includes one or more of a Y junction, a multi-mode interferometer, a trident splitter or a directional coupler.

In some embodiments, the laser light has 2 polarizations and the optical power distribution splitter includes a polarization splitter or a polarization splitter rotator.

In some embodiments, the laser light has two or more wavelengths. In some embodiments, the optical power distribution splitter includes an optical wavelength splitter. In some embodiments, the optical wavelength splitter is an asymmetric Mach Zehnder interferometer, an arrayed waveguide grating, star coupler or an Echelle grating or the like as would be readily understood by a worker skilled in the art.

Figures 4A, 4B:
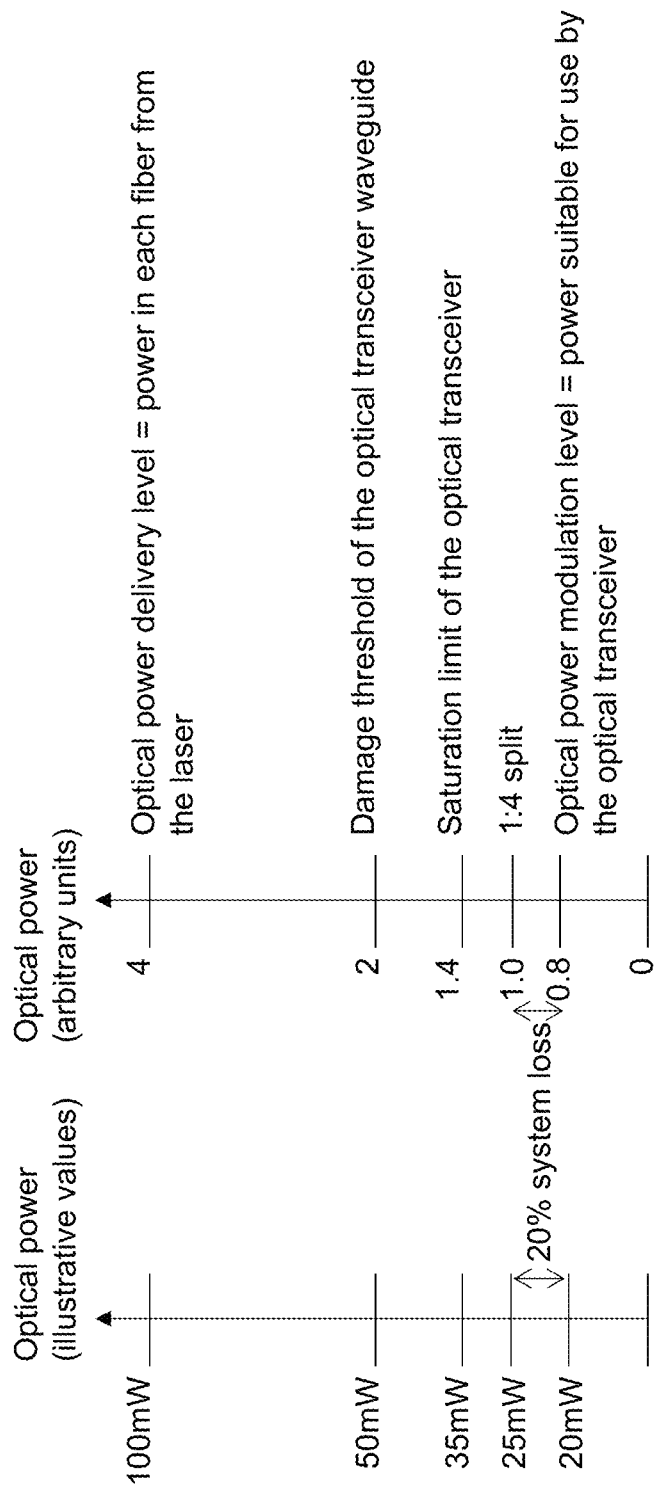
FIGS. 4A and 4B illustrate optical power splitting ranges, in accordance with embodiments.

According to embodiments, FIGS. 4A and 4B illustrate optical power splitting according to embodiments, wherein the vertical axis represents optical power. FIGS. 4A and 4B illustrate a 1:4 split of the optical power, wherein FIG. 4A defines the power split in illustrative power values including a 20% system loss and FIG. 4B illustrates the optical power split into arbitrary units also with a 20% system loss. It will be understood that the configuration of the optical power distribution splitter can be configured such that upon the division or splitting of the optical power, for example into associated lanes, each of the resulting divided or split optical power levels (for example, the optical power level associated with a particular lane) is suitable for use with the optical device (for example, transceiver, transmitter, receiver) associated therewith. It will be readily understood that any splitting configuration can be used, for example. 1:3, 1:8, 1:32 or other splitting ratio. Furthermore, it will be readily understood that the splitting of the optical power may be equal or non-equal in each lane. In some embodiments, the number of splitting outputs may be defined by a power of 2. In some embodiments, the selection of the optical power splitting ratio may be determined in order to include an allowance or margin for system losses. System losses can include but are not limited to optical coupling losses and optical absorption losses.

Figure 5:
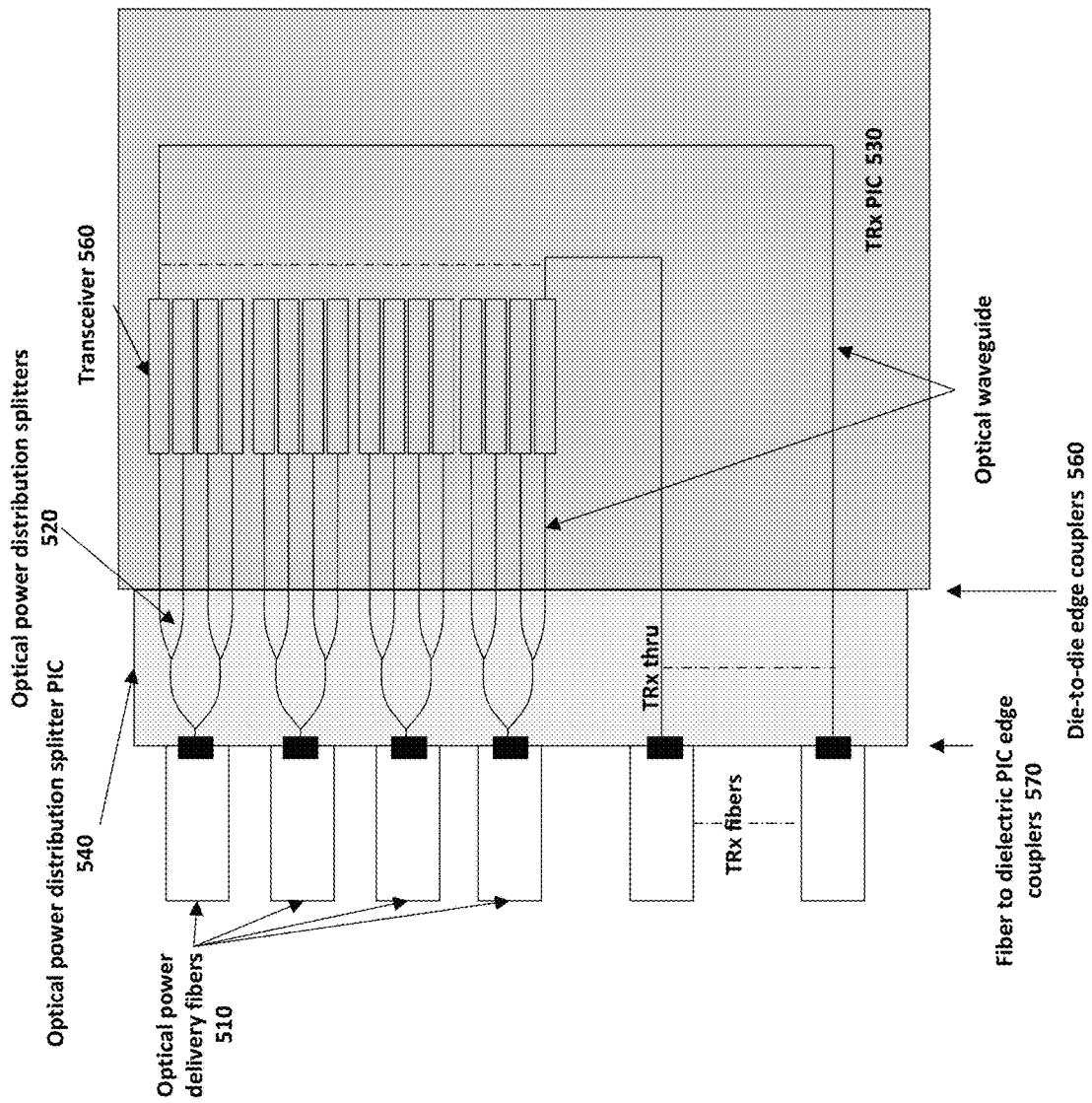
FIG. 5 illustrates an optical power distribution system which includes edge coupling between the optical fibers and the optical distribution splitter, according to embodiments.

According to some embodiments, the optical power distribution system includes photonic integrated circuits (PIC), wherein the optical power distribution splitter 520 is implemented in an optical power distribution splitter PIC 540 and the optical transceiver 560 is implemented in a separate optical device PIC, wherein the optical device PIC can be a transmitter PIC, receiver PIC or a transceiver PIC. FIG. 5 illustrates an optical power distribution system wherein a transceiver (TRx) PIC 530 is separated from the optical power distribution splitter PIC 540 in accordance with embodiments.

The optical power distribution splitter includes an all-dielectric optical waveguide. The optical transceiver includes a waveguide having a semiconductor layer.

These two PICs are separate die that are optically coupled to each other. FIG. 5 illustrates die-to-die edge coupling between the optical power distribution splitter PIC 540 and the TRx PIC 530 as well as edge coupling between the optical power delivery fibers 510 and the optical power distribution splitter PIC 540, according to embodiments. However, it will be readily understood that this coupling between the optical power distribution splitter and the TRx PIC can be formed by butt coupling, grating coupling, evanescent coupling or other form of optical coupling. As illustrated, each optical power delivery fiber 510 delivers optical power to an optical power distribution splitter 520. The optical power distribution splitter 520 can be configured to split the optical power into a 1:4 ratio, however as previously discussed this ratio can vary.

Figure 6:
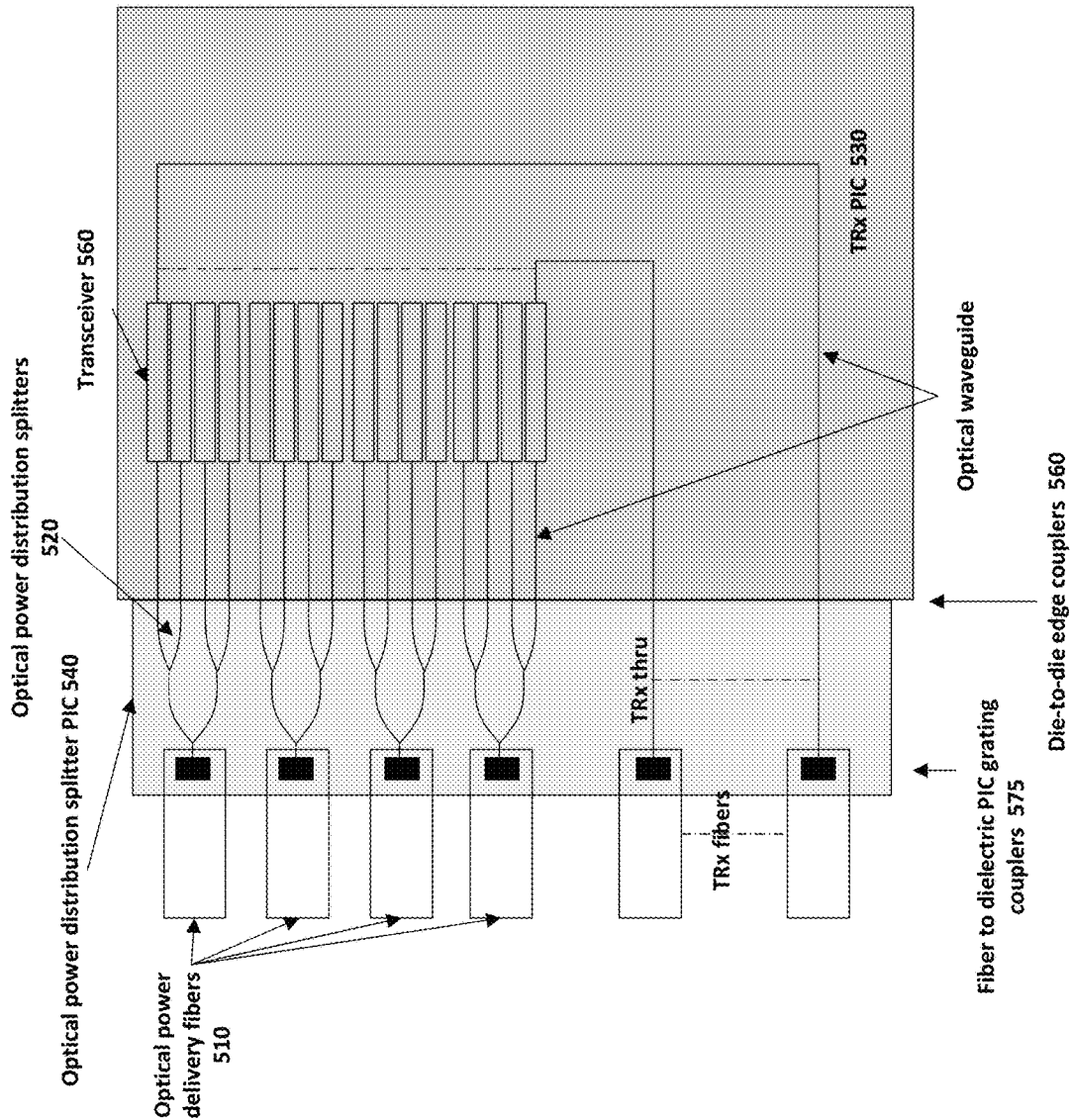
FIG. 6 illustrates an optical power distribution system which includes grating coupling between the optical fibers and the optical distribution splitter, according to embodiments.

FIG. 6 illustrates an optical power distribution system including die to die edge coupling between the optical power distribution splitter PIC 540 and the TRx PIC 530 and grating coupling 575 between the optical power delivery fibers 510 and the optical power distribution splitter PIC 540, according to embodiments.

It is noted that these embodiments which include two photonic integrated circuits, namely one for the optical power distribution splitter and the second for the optical device (e.g. transceiver, transmitter, receiver) may be advantageous because these two PICs may include different materials. As such, in some embodiments, it may be convenient to manufacture them in separate fabrication processes.

Figure 7A:
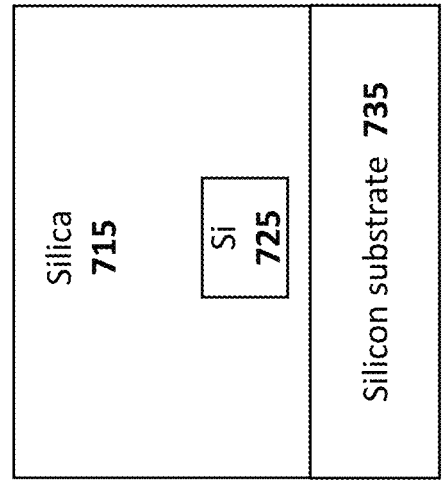
FIG. 7A illustrates a cross section of an optical power distribution splitter in accordance with embodiments.

FIG. 7A illustrates a cross section of an optical power distribution splitter PIC 540 accordance with embodiments. In this embodiment, the optical power distribution splitter PIC 540 includes a silicon substrate 730, an all-dielectric waveguide 720 formed from SiN (silicon nitride) which is encased in silica 710. It is understood that the all-dielectric waveguide can be formed from other dielectric materials which may include but not limited to silicon dioxide, silicon oxynitride or gallium phosphide among other dielectric configurations.

Figure 7B:
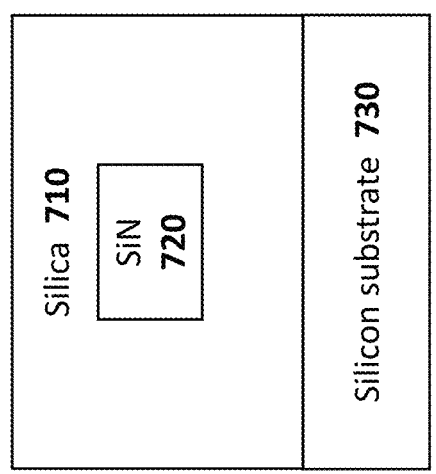
FIG. 7B illustrates a cross section of an optical device, in this example an optical transceiver, in accordance with embodiments.

FIG. 7B illustrates a cross section of optical transceiver PIC 530, in accordance with embodiments. It will be readily understood that the optical device could equally be an optical transmitter or an optical receiver. In this embodiment, the optical transceiver PIC 530 includes a silicon substrate 735 and a semiconductor material in a waveguide 725 (semiconductor waveguide) formed from silicon which is encased in silica 715. It will be understood that the semiconductor material waveguide can be formed from other semiconductor materials including but not limited to IV semiconductor materials, III-V semiconductor materials and perovskite materials for example lithium niobate, plasmonic optical modulators.

According to embodiments, one or more of the all-dielectric waveguide and the semiconductor waveguide include a plurality of layers.

Figure 8:
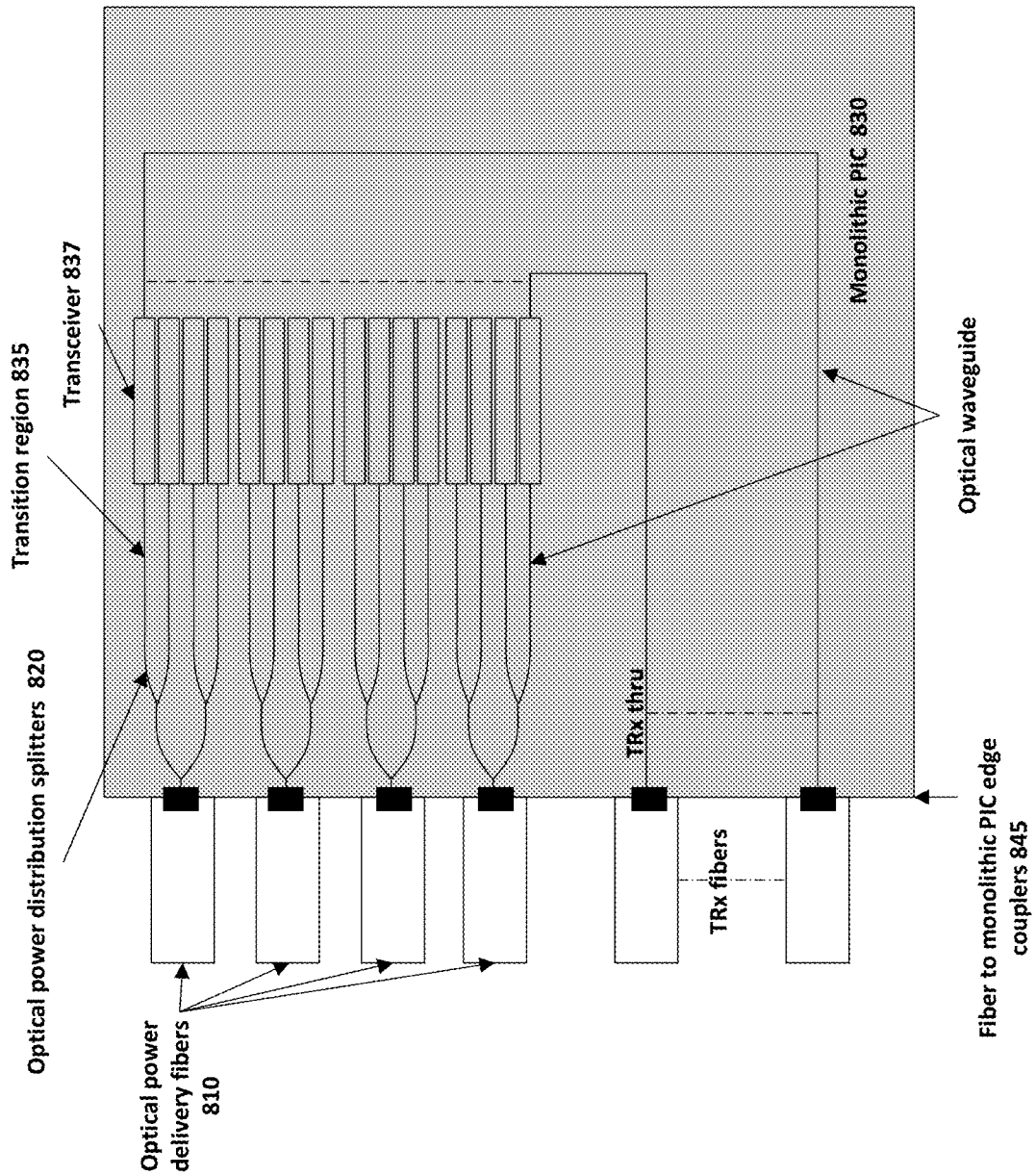
FIG. 8 illustrates an optical power distribution system which includes edge coupling between the optical fibers and a monolithic photonic integrated circuit (PIC), the monolithic PIC including the optical distribution splitter and a transceiver (TRx) PIC, according to embodiments.

According to some embodiments, the optical power distribution system includes a monolithic photonic integrated circuit (PIC), for example configured as a single die, which includes the optical power distribution splitter and the optical device, wherein the optical device can be a transmitter, receiver or a transceiver. FIG. 8 illustrates an optical power distribution system including edge coupling 845 between the optical fibers and a monolithic PIC which includes the optical distribution splitter and a transceiver (TRx), according to embodiments.

The optical power distribution splitter 820 includes a splitter waveguide including an all-dielectric optical waveguide. The optical transceiver 837 includes an optical transceiver waveguide including a waveguide having a semiconductor layer. The splitter waveguide and optical transceiver waveguide include structures fabricated within the monolithic PIC, and there is an optical coupling region 835 (which may also be known as a transition region) which provides the optical coupling between the dielectric waveguide and the transceiver waveguide. Such a photonic integrated circuit may be a monolithic PIC, wherein waveguides of different types are made on the same substrate. As illustrated, each optical power delivery fiber 810 delivers optical power to an optical power splitter 820. The optical power distribution splitter 820 can be configured to split the optical power into a 1:4 ratio, however as previously discussed this ratio can vary.

This embodiment may be advantageous because it is a single photonic integrated circuit which may include layers of different materials, and it may thus be convenient to manufacture them in a single fabrication processes known as a monolithic process. In addition, this embodiment avoids the complexity and space required to assemble separate photonic integrated circuits.

In the embodiment illustrated in FIG. 8, the optical power delivery fibers are optically coupled to the optical power distribution splitter by means of edge couplers. However, it will be readily understood that this coupling can be formed by butt coupling, grating coupling, evanescent coupling or other form of optical coupling.

Figure 9:
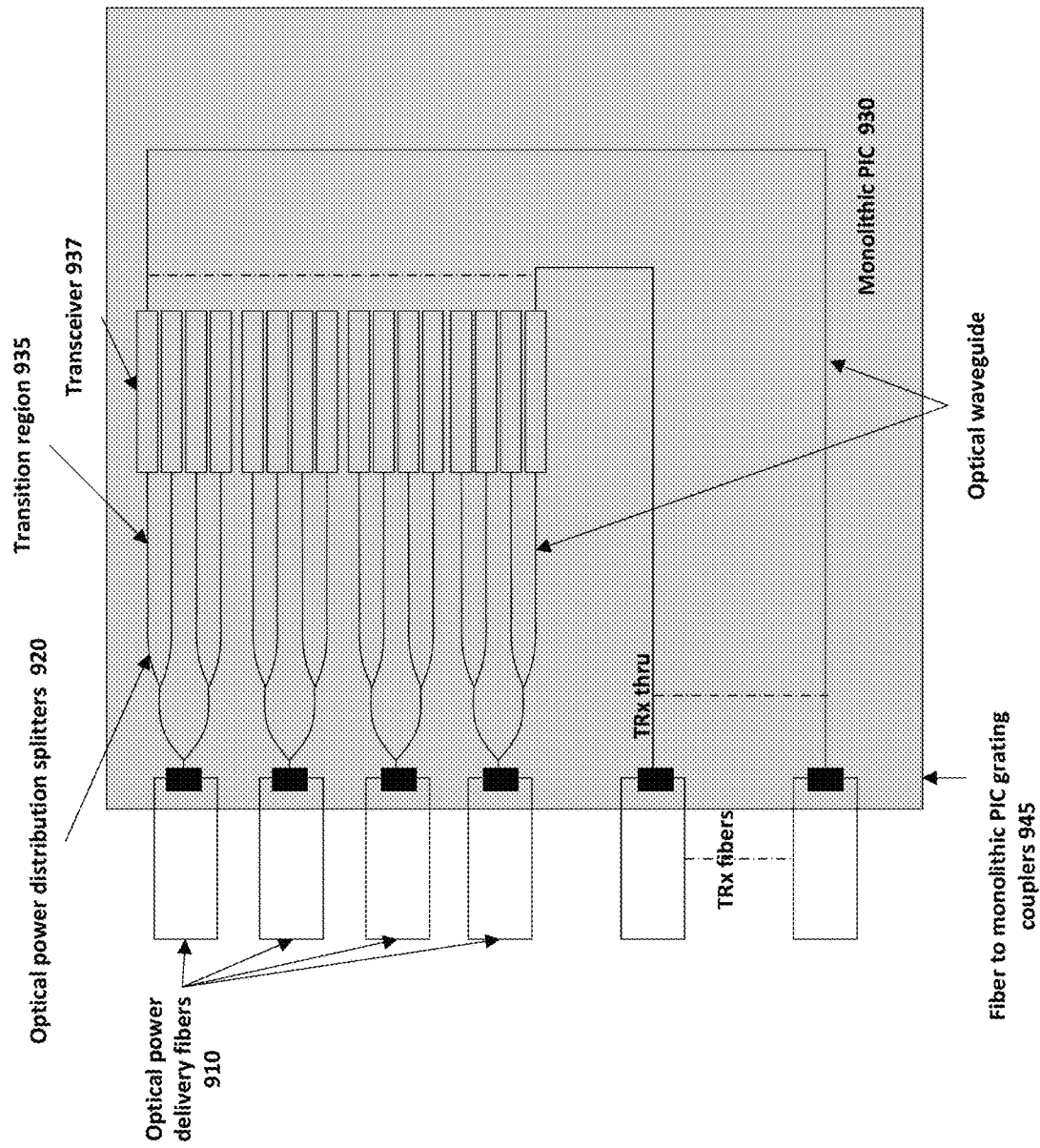
FIG. 9 illustrates an optical power distribution system which includes grating coupling between the optical fibers and a monolithic PIC which includes the optical distribution splitter and a TRx PIC, according to embodiments.

FIG. 9 illustrates an optical power distribution system wherein grating coupling 945 between the optical power delivery fibers 910 and a monolithic PIC which includes the optical distribution splitter and a TRx PIC, according to embodiments.

The optical power distribution splitter 920 includes a splitter waveguide including an all-dielectric optical waveguide. The optical transceiver 937 is in an optical transceiver waveguide including a waveguide having a semiconductor layer. The splitter waveguide and optical transceiver waveguide include structures fabricated in a photonic integrated circuit, and there is an optical coupling region 935 which defines the optical coupling between the dielectric waveguide and the transceiver waveguide. Such a photonic integrated circuit may be a monolithic PIC, wherein waveguides of different types are made on the same substrate. As illustrated, the optical power delivery fibers 910 deliver the optical power to the optical power distribution splitter 920. The optical power distribution splitter 920 can be configured to split the optical power into a 1:4 ratio, however as previously discussed this ratio can vary.

FIG. 10A, 10B, 100 collectively illustrate cross-sections of regions of a monolithic PIC sharing a common substrate 1019 in accordance with embodiments. The substrate may be silicon. The substrate can be formed from other materials including but not limited to glass, group IV semiconductor materials, group III-V semiconductor materials and perovskite materials for example lithium niobate. FIG. 10A illustrates a cross section of an optical power distribution splitter within a monolithic PIC in accordance with embodiments. In this embodiment, the optical power distribution splitter 1010 includes a portion of the substrate 1019, an all-dielectric waveguide 1017 formed from SiN (silicon nitride) which is encased in silica 1015. It is understood that the all-dielectric waveguide can be formed from other dielectric materials which may include but not limited to silicon dioxide, silicon oxynitride or gallium phosphide among other dielectric configurations.

FIG. 10B illustrates a cross section of a transition region or a shared optical coupling region between the optical power distribution splitter and an optical device, in accordance with embodiments. In this example an optical transceiver, both of which are within a monolithic PIC. In this embodiment, the transition region 1020 is between the optical power distribution splitter 1010 and the optical transceiver 1030. This transition region includes a portion of the substrate 1019, an all-dielectric waveguide 1027 formed from SiN (silicon nitride) and a semiconductor material in a waveguide 1028 formed from silicon, which is all encased in silica 1025. It is understood that the all-dielectric waveguide can be formed from other dielectric materials which may include but not limited to silicon dioxide, silicon oxynitride or gallium phosphide among other dielectric configurations. It will be further understood that the semiconductor material waveguide can be formed from other semiconductor materials including but not limited to group IV semiconductor materials, group III-V semiconductor materials and perovskite materials for example lithium niobate, plasmonic optical modulators.

It would be readily understood by a worker skilled in the art how to combine an all-dielectric waveguide and a semiconductor waveguide. Examples of such are provided in Sacher, W. D., Mikkelsen, J. C., Huang, Y., Mak, J. C., Yong, Z., Luo, X., . . . & Poon, J. K. (2018). Monolithically integrated multilayer silicon nitride-on-silicon waveguide platforms for 3-D photonic circuits and devices. Proceedings of the IEEE, 106(12), 2232-2245, which is herein incorporated by reference.

FIG. 100 illustrates a cross section of an optical device, in this example an optical transceiver, in a monolithic PIC, in accordance with embodiments. It will be readily understood that the optical device could equally be an optical transmitter or an optical receiver. In this embodiment, the optical transceiver includes a portion of the substrate 1019 and a semiconductor material in a waveguide 1037 formed from silicon which is encased in silica 1035. It will be understood that the semiconductor material waveguide can be formed from other semiconductor materials including but not limited to group IV semiconductor materials, group III-V semiconductor materials, perovskite materials for example lithium niobate, and plasmonic optical modulators.

According to embodiments, one or more of the all-dielectric waveguide and the semiconductor waveguide include a plurality of layers.

Those skilled in the art will appreciate that two-photon absorption is a significant cause of damage or saturation at high optical power in an optical waveguide. Therefore, while this disclosure has been described using an all-dielectric waveguide, it should be understood that a material with a very wide bandgap (including a semiconductor material having a wide bandgap) may be operable as a dielectric. In this embodiment, very wide bandgap may refer to a bandgap with an energy that is more than twice the energy of the photon energy of the light, such that linear absorption and two-photon absorption are suppressed. In this case, the optical absorption of the light is negligible, and the wide bandgap material is functionally equivalent to a dielectric. In such an embodiment, there is essentially no two-photon absorption in the waveguide. For example, the wavelength of the light may be 1550 nm (a photon energy of 0.8 eV) and the all-dielectric waveguide may include gallium phosphide which has a bandgap of 550 nm (a photon energy of 2.26 eV), which is more than twice the photon energy. Thus, in this example the gallium phosphide acts as a dielectric. Alternatively, the all-dielectric waveguide may include silicon nitride which has a band gap of 5 eV, which is also more than twice the photon energy.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

We claim:
1. An optical power distribution system comprising:
an input optical fiber configured to receive light having an optical power;
an optical power distribution splitter optically coupled to the input optical fiber, the optical power distribution splitter including an all-dielectric optical waveguide, the optical power distribution splitter configured to divide the optical power into two or more portions; and an optical device optically coupled to the optical power distribution splitter, the optical device including an optical device waveguide having a semiconductor layer, the optical device configured to receive a first portion of the optical power;

wherein the optical power of the light is larger than a damage threshold of the optical device waveguide or the optical power of the light is larger than a saturation limit of the optical device.

2. The optical power distribution system according to claim 1, wherein the optical device is an optical transceiver and the waveguide having the semiconductor layer is an optical transceiver waveguide.

3. The optical power distribution system according to claim 1, wherein the first portion of the optical power is indicative of an optical power modulation level suitable for use by the optical device.

4. The optical power distribution system according to claim 1, wherein the all-dielectric optical waveguide is parallel to and overlapping the optical device waveguide.

5. The optical power distribution system according to claim 1, wherein the all-dielectric optical waveguide and the optical device waveguide are configured as layers within one die, wherein the all-dielectric optical waveguide and the optical device waveguide are optically coupled together within a shared optical coupling region.

6. The optical power distribution system according to claim 5, wherein the shared optical coupling region includes a directional coupler or an adiabatic coupler.

7. The optical power distribution system according to claim 1, wherein the all-dielectric optical waveguide is collinear to the optical device waveguide.

8. The optical power distribution system according to claim 1, wherein the all-dielectric optical waveguide and the optical device waveguide are formed on separate die that are optically coupled, wherein the separate dies are optically coupled using die-to-die edge coupling, die-to-die evanescent coupling or die-to-die grating coupling.

9. The optical power distribution system according to claim 1, wherein the optical power distribution splitter includes an input optical waveguide optically coupled to two or more output optical waveguides implemented on one die.

10. The optical power distribution system according to claim 1, wherein the optical power distribution splitter includes an optical splitter that is wavelength independent.

11. The optical power distribution system according to claim 1, wherein the optical power distribution splitter includes one or more of a Y junction, a multi-mode interferometer, a trident splitter, an adiabatic coupler and a directional coupler.

12. The optical power distribution system according to claim 1, wherein the light generated by the external laser source has two polarizations.

13. The optical power distribution system according to claim 12, wherein the optical power distribution splitter includes a polarization splitter or a polarization splitter rotator.

14. The optical power distribution system according to claim 1, wherein the light has two or more wavelengths.

15. The optical power distribution system according to claim 14, wherein the optical power distribution splitter includes an optical wavelength splitter.

16. The optical power distribution system according to claim 15, wherein the optical wavelength splitter is configured as one or more of an asymmetric Mach Zehnder interferometer, an arrayed waveguide grating, an Echelle grating and a star coupler.

17. The optical power distribution system according to claim 1, wherein the optical device is one or more of a transmitter, a receiver, a detector, a direct-modulation transmitter, a coherent-modulation transmitter and a coherent-detection detector.

18. The optical power distribution system according to claim 1, wherein the all-dielectric optical waveguide includes material having a bandgap and the light generated by the external laser source has a photon energy, wherein the bandgap is greater than twice the photon energy.

* * * * *